June 23, 1964  R. C. ZEIDLER  3,138,107
HYDRODYNAMIC COUPLING DEVICES
Filed Nov. 20, 1961  2 Sheets-Sheet 1
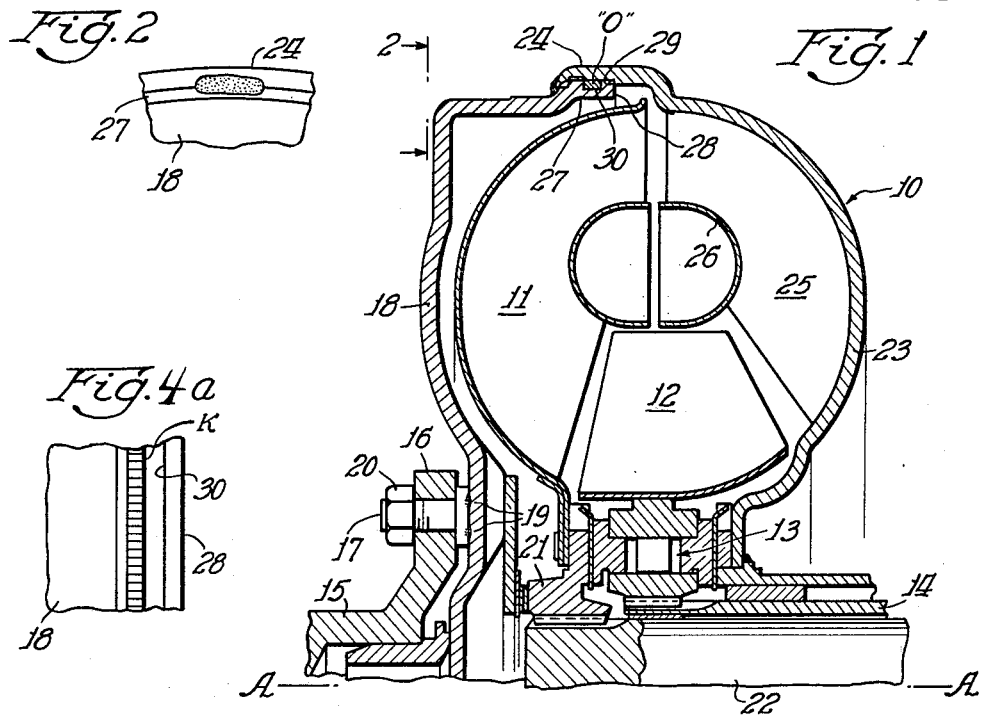
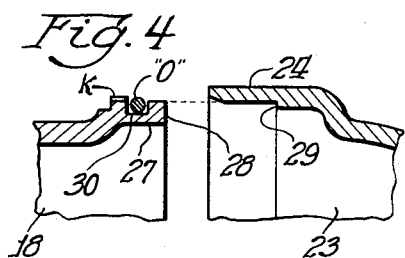
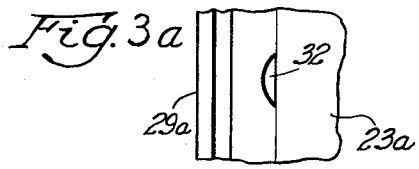
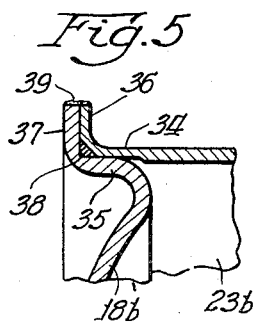
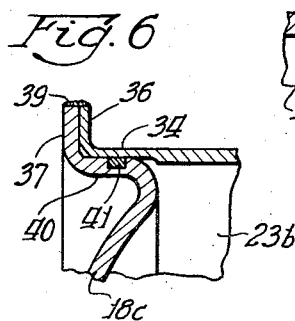
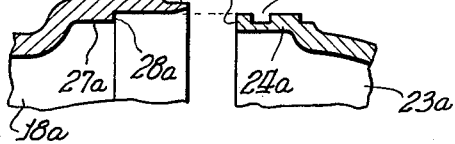
Inventor:
Reinhold C. Zeidler
By: John W. Butcher
Atty.

June 23, 1964 R. C. ZEIDLER 3,138,107
HYDRODYNAMIC COUPLING DEVICES
Filed Nov. 20, 1961 2 Sheets-Sheet 2
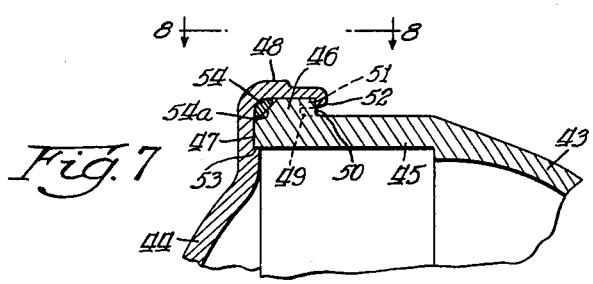
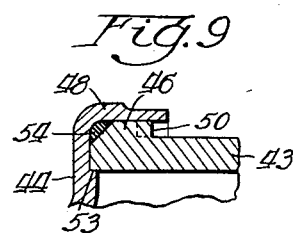
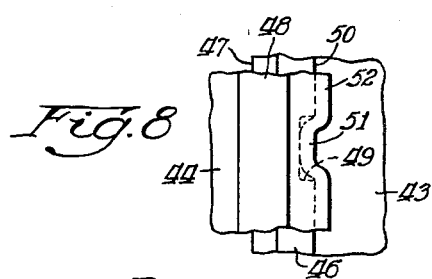
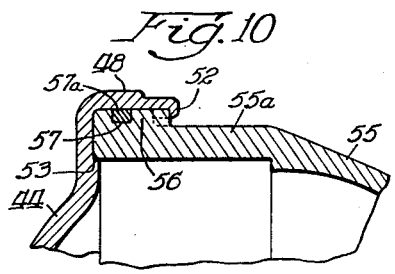
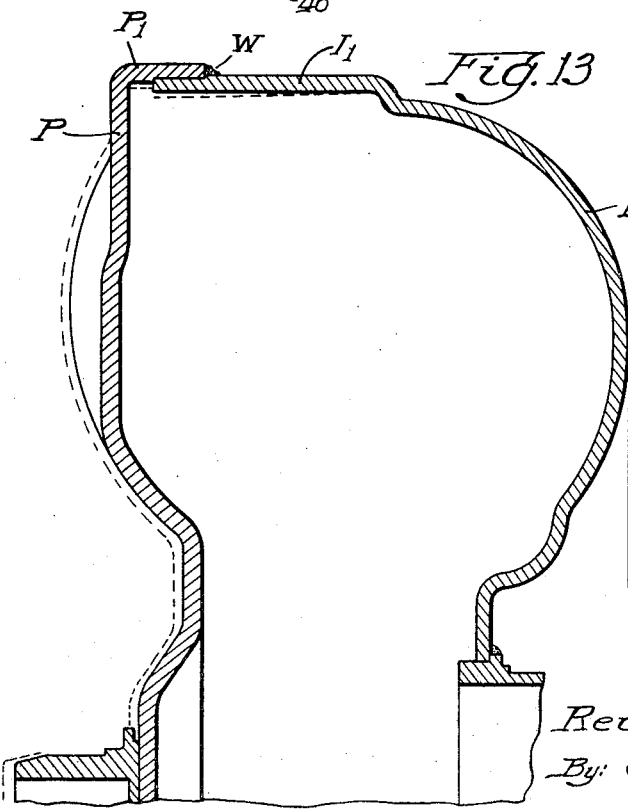
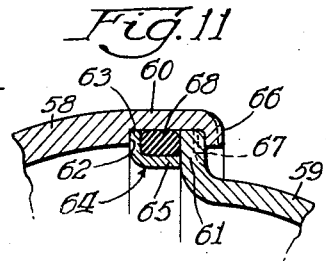
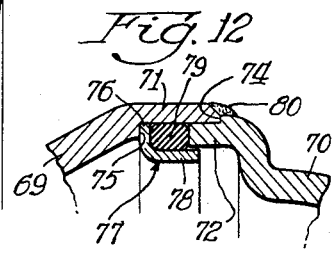
Inventor:
Reinhold C. Zeidler
By: John W Butcher
Atty.

United States Patent Office 3,138,107
Patented June 23, 1964

3,138,107
HYDRODYNAMIC COUPLING DEVICES
Reinhold C. Zeidler, Detroit, Mich., assignor to Borg-Warner Corporation, Chicago, Ill., a corporation of Illinois
Filed Nov. 20, 1961, Ser. No. 153,601
3 Claims. (Cl. 103—111)

This invention relates to hydrodynamic coupling devices and more particularly to housings of such devices providing a toroidal fluid circuit in which are disposed impeller blades and turbine blades, the housing comprising two substantially semi-toroidal shells with the impeller blades being preferably connected to one of the shells of the housing, the turbine blades being connected to a separate coupling member relatively rotatable to the housing.

Hydraulic coupling devices such as fluid couplings and torque convertors have in the past been formed with two substantially semi-toroidal shells, the shells being respectively formed of aluminum and steel, or both shells being formed of steel. In assembling aluminum and steel shells, it has been the conventional practice to connect the shells at their radially outer peripheries with bolts or screw-threaded devices to connect the aluminum shell to the steel shell in view of the inability of welding, or otherwise, connecting, the aluminum shell to the steel shell. This is an expensive operation in view of the necessity of forming screw threads in at least one of the shells to receive the bolts, and providing openings in the other shell to receive the bolts to be threaded into the first-mentioned shell; or alternatively, providing a separate screw-threaded ring engaging one of the shells and threads on the other shell in order to assemble the shells together. In either case, the connection of an aluminum shell to a steel shell involves a multitude of expensive operations, including hand operations, to provide the satisfactory assembly of the shells. It has been found simpler and inexpensive to connect two steel shells together to form the housing, by telescoping the two steel shells at their outer peripheries, and providing a continuous weld between the edge of the outer telescoping member and the outer surface of the inner telescoped member to insure a satisfactory connection between the two shells, and to prevent the possibility of any leakage of the fluid from the housing provided by connected shells.

In conventional automotive transmission practice, the hydrodynamic coupling device embodying the housing has one of the shells thereof usually connected to the crankshaft of the engine, either directly or by a drive plate, and the turbine member of the fluid coupling or torque converter is connected to the transmission input shaft, the crankshaft and the transmission being disposed on a common axis and terminating at fixed spaced points on the axis for reception of the hydrodynamic coupling device therebetween and connection to the shafts. Thus, it is necessary that the axial dimension of the device be consistently maintained to insure the proper location between the engine and transmission and connection to the engine crank shaft and the transmission input shaft. It has been found by connecting the two shells forming the fluid-containing housing, by a continuous weld, reduction in the diameter of the housing occurs adjacent to the weld. This reduction in diameter extends a short distance on either side of the weld and is caused by the fact that, during the welding operation, the two telescoped shells adjacent to the weld become highly heated, so that consequently, upon cooling, the shrinkage produces a reduction in the diameter. This reduction in the diameter, and particularly where the shell of the housing, connected to the engine crankshaft, is shallow causes this shell to bulge toward the engine crankshaft and destroys the required accurate axial dimension of the hydrodynamic coupling device for location between and assembly with the engine crankshaft and the transmission input shaft. This undesirable factor has provided an obstacle, in many cases, to utilizing a housing formed of two shells provided with a continuous weld, as described, in the assembly of the two shells at the factory, and a condition which is considerably aggravated in the service field where the two shells of the housing must be disconnected and then rewelded after the necessary repairs have been made to the hydrodynamic coupling device.

It is the object of the present invention to provide an improved structure and assembly of two shells of a hydrodynamic coupling device housing in which the two shells of the housing may be assembled in a ready and facile manner, during the assembly operation without deformation or distortion of the shells and consequent changes in the axial and diametrical dimensions of the housing.

It is another object of the invention to provide an improved structure and assembly of housings for hydrodynamic coupling devices in which the two telescoped outer portions of the shells of the housing are connected to each other while maintaining the original shape of the shells and within the predetermined space limits required for assembly of the devices between the engine and the transmission of an automotive vehicle.

Another object of the invention is to provide a new and improved structure and assembly of two shells of a housing of a hydrodynamic coupling device, having telescoping outer peripheries connected to each other by welding, or by interlocking portions thereof, to provide a connection insuring the two shells from disassembly under the combination of hydraulic static pressure and centrifugal force encountered in the operation of the hydrodynamic coupling devices.

The invention consists of the novel constructions, arrangements, devices and methods of assembly to be hereinafter described and claimed for carrying out the above-stated objects, and such other objects as will appear from the following description of certain preferred embodiments illustrated in the accompanying drawings, wherein:

FIG. 1 is a fragmentary side elevation, partly in section, of a hydraulic torque converter showing a preferred embodiment of the invention;

FIG. 2 is a fragmentary elevation view, taken along line 2—2 of FIG. 1;

FIG. 3 and FIG. 3a illustrate an alternate embodiment of the invention illustrating the respective parts prior to the assembly thereof;

FIG. 4 and FIG. 4a illustrate another alternate embodiment of the invention;

FIG. 5 is another embodiment of the invention illustrating a different type of connection of the two shells of the housing;

FIG. 6 is similar to FIG. 5, illustrating a different location of the seal ring;

FIG. 7 is a sectional view illustrating another embodiment of the invention and illustrating a further type of connection of the two shells of the housing;

FIG. 8 is top plan view of the connection shown in FIG. 7, as indicated by the plane 8—8 of FIG. 7;

FIG. 9 is a view similar to FIG. 7, but illustrating the disposition of the shells prior to connecting the shells by a final assembly operation;

FIG. 10 is a view similar to FIG. 7, illustrating a different location of the seal ring between the two shells;

FIG. 11 is a sectional view illustrating another embodiment of the invention;

FIG. 12 is a sectional view illustrating a further embodiment of the invention; and FIG. 13 is a fragmentary sectional view of a housing having its two shells connected together in accordance with prior art practice.

Referring now to the drawings and first describing the hydrodynamic coupling device shown as a hydraulic torque converter in FIG. 1, the converter comprises a vaned driving element or impeller or pump 10, a vaned driven element or turbine 11, and a vaned reaction element or stator 12, the pump functioning to impart energy to a body of liquid in the torque converter, the turbine receiving energy from the liquid, and the stator being held from rotation and acting to change the direction of the flow of the liquid so that the device functions to multiply torque.

A one-way brake 13 of the sprag type is disposed between the stator 12 and a stationary cylindrical portion 14 of a transmission casing, the one-way brake being operative to prevent rotation of the stator in one direction during the torque multiplication stages of the converter, while permitting rotation of the stator in the opposite direction at what is commonly termed the coupling point of the torque converter. The vanes of the pump, turbine and stator may be of the type illustrated and described in the U.S. Patent 2,663,149, issued December 22, 1953.

The pump 10 is connected to an engine (not shown) having a shaft 15 driven thereby and provided with a flange 16 connected by bolts 17 to a drive member 18 connected to the pump 10 for driving the pump. As seen in FIG. 1, the bolts 17 may have their heads spot-welded as at 19 to the drive plate with the shank of the bolts extending through openings in the engine shaft flange 16 and being secured thereto by nuts 20. The turbine 11 is provided with a hub 21 splined to a driven shaft 22 which may be the input shaft of a gear set of a transmission. The impeller 10 is provided with a hub rotatably supported upon the cylindrical portion 14 of the transmission casing.

The hydraulic torque converter is designed to be filled with a liquid for the transmission of torque from the impeller 10 rotated by the engine, to the turbine 11 connected to the driven shaft 22. It will be seen from an inspection of FIG. 1 that the impeller 10 is provided with a hollow substantially semi-toroidal shell 23 having its radially outer periphery defined by an annular portion or cylindrical flange 24, vanes 25 being disposed between and connected to a core ring 26 and the shell 23. The drive plate 18 is a hollow shell formed with a substantially semi-toroidal portion provided with a radially outer annular peripheral portion defined by a flange 27 bent relative to the semi-toroidal portion such that the flange 27 extends toward the semi-toroidal portion. The flange 27 is adapted to mate with the cylindrical flange 24. The flange 27 is radially inwardly of the cylindrical flange 24 of the shell 23, such that the two flanges extend in opposite directions relative to the axis of rotation A—A of the torque converter. The semi-toroidal portions of the shells 18 and 23 thus define a housing forming a fluid chamber for containing fluid in the fluid torque converter. The telescoped flange 27 of the shell 18 and the telescoping flange 24 of the impeller shell 23 are provided with shoulders 28 and 29, respectively having radial surfaces cooperating to engage each other to locate the shells 18 and 23 in a predetermined axially spaced relation. The flange 27 of the shell 18 is provided with an annular groove 30 receiving a ring "O" of synthetic or natural rubber, the ring being compressed between the flanges 24 and 27 and providing a seal to prevent the flow of liquid between the telescoped flanges and from the converter under centrifugal pressure or hydraulic static pressure forces in the housing during operation of the converter.

The edge of the cylindrical flange 24 may be secured to the shell 18 in assembly by rolling or spinning the terminal edge of the flange 24 to provide an inwardly directed continuous lip to prevent axial movement of the shells away from each other. Alternatively, the edge of the cylindrical flange 24 may be secured to the shell 18 in assembly by a plurality of circumferentially spaced spot welds extending between and connecting the terminal edge of the flange 24 and the shell 18. This mode of assembly prevents the shells from slipping apart under the combination of hydraulic static pressure and centrifugal force. The welding operation takes place quickly and a minimum amount of heat is generated, and, due to the fact that only a small amount of welding is applied, very little distortion, if any, of the welded parts occurs. The shells 18 and 23 are formed of sheet steel stampings having their outer annular flanges 24 and 27, respectively, machined accurately to permit a close slip fit, with the shoulders 28 and 29 in both shells permitting the shells to engage a predetermined amount so that the overall height of the assembly is maintained. It will be apparent that the small amount of welding accomplished quickly at localized circumferentially spaced portions of the end of the flange 24 and the flange 27, eliminates the possibility of any distortion of the shells occurring to reduce the diameter of the assembly or to lengthen the axial dimension of the torque converter.

FIG. 13 illustrates a conventional housing of a hydraulic torque converter comprising two shells I and P having telescoping flanges $P_1$, $I_1$ with a continuous weld W between the edge of the flange $P_1$ and the outer surface of the flange $I_1$. It has been found, in welding the two shells together in the manner described to form the torque converter housing, objectionable distortion of the shells occurs as there is a reduction in diameter extending a short distance on either side of the weld causing the shell P to be distorted and to increase its axial dimension as indicated in dotted lines in FIG. 13. This reduction on diameter of the shells P and I of the converter housing is caused by the fact that, during the welding operation, the two shells have their portions, adjacent to the weld, highly heated and, consequently, upon cooling the shrinkage produces a reduction in diameter of as much as .025 inch with the attendant result that the housing is distorted in an axial dimension which renders it incapable of being fitted within or located in the predetermined axial space alloted to it between an engine and a transmission and connection to the engine crankshaft and transmission input shaft, with the result that the torque converter may not be suitable for installation in the limited space provided for it between the engine and transmission by automobile manufacturers.

It will be seen that, in the assembly of the shells 18 and 23 of the housing in FIG. 1, the very limited and quick application of heat at circumferentially spaced points on the edge of the flange 24 and on the flange portion 27 of the shells will prevent any possibility of the shells 18 and 23 being distorted during the assembly operation.

FIGURE 3 illustrates another embodiment of the invention affording a connection between two shells 18a and 23a, of a torque converter housing, the shell 18a and the shell 23a having semi-toroidal portions, telescoping radially outer annular portions or flanges 27a and 24a. The flanges 27a and 24a are provided with abutting shoulders 28a and 29a, similar to the features illustrated in FIG. 1. A resilient rubber ring may be disposed in a groove 30a in the flange 24a for engagement with the flange 27a of the shell 18a. In this embodiment of the invention, the shell 18a is provided with a plurality of circumferentially spaced indents 32 as shown in FIG. 3a. The outer terminal edge of the axially extending flange 27a is provided with a lip 33 which is adapted to engage the circumferentially spaced indents 32 such that the lip 33 and the indents 32 afford a connection between the shells 18a and 23a.

FIG. 4 illustrates an embodiment similar to the embodiment illustrated in FIG. 3 except that a knurled surface K (FIG. 4a) is provided on the flange 27 of the shell 18. This knurled surface provides a connection between the shell sections which connection is capable of transmitting a higher torque load than the connection illustrated in FIG. 3.

The assembly illustrated in FIGS. 3, 3a, 4 and 4a of the two shells of the housing of the torque converter cannot, in any way, cause distortion of the two shells as the spinning or rolling operation is only effective upon the thin outer marginal edge of one shell in engaging the other shell.

FIG. 5 illustrates another embodiment of the invention in which two opposed hollow shells 18b and 23b have radially outer annular portions or flanges each formed by angularly related parts extending respectively in axial and radial directions. The axially extending parts 34 and 35 are in telescoped relation and the radially outwardly extending parts 36 and 37 are engaged with each other as clearly shown in FIG. 5, the radially extending part 37 of the flange of the shell 18b being bent at right angles to the axially extending part of the flange of the shell and the radially extending part 36 of the flange of the shell 23b also being bent at right angles to the axially extending part 34 of the flange of the shell. A circlular ring 38 of natural or synthetic rubber is positioned between and at the juncture of the angularly disposed parts 35 and 37 of the flange of the shell 18b and the angularly disposed parts 34 and 36 of the flange of the shell 23b to provide a seal to prevent the escape of fluid from the housing formed by the shells 18b and 23b. In the assembly of the shells, the axially extending parts 34 and 35 are disposed in telescoping relation to effect engagement of the outwardly directed parts 36 and 37 to thereby compress the rubber ring 38 between the flanges of the shell 18b and the shell 23b. The radially outer edges of the flanges are each radially disposed the same distance from the axis of the torque converter so that plurality of welds 39, provided thereon by puddle or tack welding at circumferentially spaced areas thereof, will securely hold the shells 18b and 23b connected to each other against relative rotation and movement of the shells 18b and 23b away from each in axial direction, the abutting parts 36 and 37 of the flanges preventing axial movement of the shells 18b and 23b toward each other.

The embodiment of the invention illustrated in FIG. 6 is similar to that illustrated in FIG. 5 with the exception that the telescoped radially inner axially extending part 40 of the flange of the shell 18c is provided with an annular groove 41 receiving an O ring of natural or synthetic rubber compressed between the telescoping parts of the flanges of the shells 18c and 23b to prevent any possibility of leakage of the fluid from the housing defined by the shells.

In the embodiments of the invention illustrated in FIGS. 5 and 6, the welding operation takes place quickly and with a minimum amount of heat being generated so that with the small amount of welding applied very little distortion, if any, occurs in the parts.

FIGS. 7, 8 and 9 illustrate another embodiment of the invention for assembling two opposed hollow shells 43 and 44 having substantially semi-toroidal portions, as shown in FIG. 1. The shell 43 is preferably formed as as aluminum casting provided with a radially outer annular portion or flange 45 having an annular rib 46 projecting radially outwardly from the outer cylindrical surface thereof at its circumferentially extending edge 47. The shell 44 is provided with a radially outer portion or axially extending flange 48 in telescoping relation to the flange 45 and engaging rib 46. As seen more particularly in FIG. 8, the rib 46 is provided with a plurality of circumferentially spaced notches or recesses 49 in the radially extending surface at one side thereof, for receiving a plurality of tongues 51 entering into the notches 49 during the spinning or rolling operation of the circumferentially extending end of the flange 48 to provide a radially inwardly extending annular lip 52 engaging the side 50 of the rib 48 to prevent relative axial movement of the shell 44 and the shell 43 away from each other and to prevent relative rotation of the shells. As seen in FIG. 7, the shell 44 is provided with a shoulder 53 having an axially extending surface engaging the radially inner surface of the cylindrical flange 45 of the shell 43. It will be seen that the abutment of the end of the flange 45 of the shell 43 with the radially extending portion of the shell 44, in coopertaion with the lip 51 engaged with the rib 46, prevents relative axial movement of the two shells.

A ring 54 of natural or synthetic rubber is disposed between the flanges 45 and 48 at the juncture of the radially and axially extending portions of the flange 48 and engages an inclined surface 54a on the end of the flange 45 and the ring is thereby compressed between the two shells to prevent leakage of fluid between the flanges and from the housing. The formation of the rib 46 on the shell 43 is related to the flange 48 of the shell 44 so that the abutment of the end of the flange 45 of the shell 43 against the shell 44 positions the end of the flange 48 to be moved radially inwardly by a rolling or die operation from the position shown in FIG. 7 and over the side 50 of the rib 46 to engage the same and to enter the notches 49 in the rib 46, as shown in FIGS. 8 and 9.

The embodiment of the invention illustrated in FIG. 10 is similar to that illustrated in FIGS 7, 8 and 9 with the exception that the cylindrical portion 55a of the cast aluminum shell 55 is provided with a rib 56 having an annular groove 57 therein for receiving an O ring 57a compressed between the flange 48 of the shell 44 and the flange 55a of the shell 55.

In each of the embodiments of the invention illustrated in FIGS. 7, 8 and 9 and FIG. 10, the shoulder 53 on the shell 44 is essential to prevent the shell 43 or 45 from collapsing inwardly during the rolling or die operation flanging over the end of the flange 48 of the shell 44 to form the lip 52. In each of these assembly operations, the shell 44 and the shell 43 or 45 are required to be pressed together so that the edge 47 of the shell 43 or 45 butts firmly against the shell 44 and the seal ring is compressed a desired amount to prevent leakage of fluid. It will be apparent that, in the absence of the shoulder 53 on the shell 44, the shell 43 or 45 might be distorted inwardly during the forming connecting operation, which would relieve the pressure on the seal ring and possibly permit leakage of the fluid from the housing.

It will be apparent from an inspection of the two embodiments illustrated in FIGS. 7, 8 and 9 and in FIG. 10, that the two shells are held tightly secured together against relative axial movement and relative rotary movement by the assembly operations described.

In the embodiment of the invention of FIG. 11, another form of connection is illustrated between a drive plate 58 and impeller casing 59 providing two opposed shells having substantially semi-toroidal portions as shown in FIG. 1. The shell 58 has an outer circumferentially extending annular flange 60 surrounding a radially extending flange 61 of the shell 59. The flange 60 forms a reduced end portion of the shell 58 to provide a shoulder 62 defining a pocket with the flange 61, the shoulder abutting the radially extending portion 63 of an annular sheet metal stamping or ring 64 of L-section extending within the pocket, the axially extending portion 65 of the ring having its edge engaging the side of the flange 61 of the shell 59, and the edge of the ring portion 63 being seated against the circumferentially extending inner surface of the flange 60. The ring 64 thus serves to space the shells 58 and 59 so that, in the assembly operation, the end of the flange 60 extends axially beyond the flange 61. As in the embodiment illustrated in FIGS. 7–9, inclusive, the end of the flange 60 is formed over by a rolling or die operation to form a lip 66 in engagement with the side of the flange 61 to secure the shells together against axial movement away from each other and with portions of the lip entering notches 67 in the side of the flange 61 to prevent relative rotation of the shells. A seal ring 68 of compressible material, such as rubber, and which may be an O ring, is received within the L-shaped ring 64, as shown, is compressed between the ring 64 and the flanges 60 and 61 to prevent leakage of fluid from the connected shells. In the assembly operation, when the two shells are pressed together to compress and load the rubber seal, the rubber seal bottoms against the ring 64 and through it to the shoulder 62, and while the parts are held in this position, the end of the flange 60 is formed over to lock the two shells together.

Referring to FIG. 12 showing another type of connection between two shells 69 and 70, the shell 69 has a circumferentially extending annular flange 71 in telescoping relation to a flange 72 of the shell 70. The end of the flange 72 is machined at its outer diameter to provide a reduced portion providing a shoulder 74 abutting the edge of the flange 71 to position the shells in predetermined axial relation to each other. The end of the flange 71 is also of reduced diameter to provide a shoulder 75 defining a pocket with the end of the flange 72, the shoulder 75 abutting the side of a radially extending portion 76 of an annular sheet metal stamping or ring 77 of L-section. The ring 77 has its axially extending portion 78 extending toward and disposed radially inwardly of the end of the flange 72. Disposed within and engaging the ring 77 is a rubber seal ring 79 in engagement with the ring 77, the end of the flange 72 and the inner surface of the reduced portion of the flange 72.

In the assembly of the shells, the shells are held tightly together with the shoulder 75 of the flange 71 and the end of the flange 72 compressing the seal ring 79 a predetermined amount while a welding operation is performed to provide a plurality of circumferentially spaced welds 80 between the flanges 71 and 72 as shown. The edge of the flange 71 may be beveled and recesses formed therein and in the flange 71 to provide sufficiently large adjacent areas to insure satisfactory welds 80 between the flanges to securely connect the shells to each other.

The connections and assembly of the shells illustrated in FIGS. 1-4 and 7-11 may be serviced in the field by seervice stations and garages by reversely rolling the spun-over edge of the telescoping shell allowing the two shells to be readily disassembled for servicing of the torque converter, including replacement of the seal ring, and thereafter the two shells may be telescoped and the edge of the telescoping shell again either spun or rolled over the telescoped shell to connect the shells together.

If the alternative form of connection is used, i.e., circumferentially spaced spot welds, the two shells can be easily disassembled by removing the welds by machining about .050 inch of the edges of the telescoping end of the shell, and in FIG. 12, the welds may be removed by machining the welds from the shells and in each case, a new seal ring is then installed. Since no distortion occurred originally in the welding operation, the shells can then be quickly telesccoped again to abut their original shoulders or engaging parts and thereafter the welding operation to connect the shells can be done with equipment available at any service station or garage.

It will be apparent from the foregoing description that I have provided improved structures and assemblies of shells of fluid-containing housings of hydrodynamic coupling devices, which may be of the fluid coupling or hydraulic torque converter types, in which two shells may be readily assembled and secured together in a manner retaining the original shapes of the shells to provide housings with uniform axial and radial dimensions to satisfy the limited space requirements both diametrically and axially for torque converters and fluid couplings as required in various installations and particularly in automotive applications. In many cases, it is desirable to dispose the fluid coupling or torque converter in a limited diametrical space. The connections of the shells in accordance with the invention is particularly practical in view of the fact that any of the connections require only a slight increase in diametrical space in some instances. This feature is advantageous where limited diametrical space would make it impossible for housings of the bolted flange design to be utilized.

This application is a continuation-in-part of a co-pending application entitled "Hydrodynamic Coupling Devices," Serial Number 509,718, filed May 20, 1955, now issued Patent Number 3,024,735, dated March 13, 1962.

While this invention has been described in detail and in several forms or embodiments, it will be apparent to persons skilled in the art after understanding the improvements, that various changes and modifications may be made therein in structure and methods of assembly without departing from the spirit or the scope thereof. It is therefore aimed in appended claims to cover all such changes and modifications.

I claim:
1. In a hydrodynamic coupling device, two opposed sheet metal stampings of a thickness sufficiently thin that, if welded with a continuous weld, will exhibit radial distortion of said stampings due to the heat of the welding operation having hollow portions defining a toroidal fluid containing housing, said stampings being provided with radially outer telescoping annular portions projecting toward each other, said opposed stampings having a positive axial stop means therebetween, one of said stampings having a circumferential edge positioned adjacent the other of said stampings, seal means disposed between said stampings providing the sole barrier to fluid egress, and circumferentially spaced welds integral with said circumferential edge and integral with the other of said stampings connecting said stampings to each other, said circumferentially spaced welds being of an extent sufficient to provide for a positive connection between said stampings and of an extent insufficient to cause an appreciable amount of distortion of said stampings due to the heat of welding.

2. In a hydrodynamic coupling device, two opposed sheet metal stampings of a thickness sufficiently thin that, if welded with a continuous weld, will exhibit radial distortion of said stampings due to the heat of the welding operation having hollow portions defining a toroidal fluid containing housing, said stampings being provided with radially outer telescoping annular portions projecting toward each other such that a circumferential edge of one of said stampings projects about the other of said stampings, said stampings having a positive axial stop means therebetween, a plurality of indents formed in said other of said stampings, said circumferential edge being adapted to be deformed into engagement with said indents to provide the sole means to interlock said stampings together against axial separation, and seal means disposed between said stampings to provide the sole barrier to egress of fluid.

3. An apparatus in accordance with claim 2 wherein one of said annular portions is provided with means cooperating with the other of said annular portions to form a driving connection between said opposed shells.

References Cited in the file of this patent

UNITED STATES PATENTS

| | | |
|---|---|---|
| 1,605,229 | Hartmann | Nov. 2, 1926 |
| 2,140,106 | Cox et al. | Dec. 13, 1938 |
| 2,192,968 | Fieser | Mar. 12, 1940 |
| 2,498,395 | Coss | Feb. 21, 1950 |
| 2,574,273 | McLeod | Nov. 6, 1951 |
| 2,657,807 | Launder | Nov. 3, 1953 |
| 2,658,692 | Wolf | Nov. 10, 1953 |
| 2,665,553 | Foster et al. | Jan. 12, 1954 |
| 2,724,893 | O'Connor et al. | Nov. 29, 1955 |
| 2,748,715 | Mamo | June 5, 1956 |
| 2,777,292 | Mazzola | Jan. 15, 1957 |
| 2,786,423 | Coffey | Mar. 26, 1957 |

FOREIGN PATENTS

| | | |
|---|---|---|
| 320,858 | Great Britain | Oct. 24, 1929 |